United States Patent [19]

Sugiyama

[11] Patent Number: 5,793,894
[45] Date of Patent: Aug. 11, 1998

[54] IMAGE DATA EDITING APPARATUS AND DECODING APPARATUS

[75] Inventor: Kenji Sugiyama, Yokosuka, Japan

[73] Assignee: Victor Company of Japan, Ltd., Yokohama, Japan

[21] Appl. No.: 496,245

[22] Filed: Jun. 28, 1995

[30] Foreign Application Priority Data

Jun. 29, 1994 [JP] Japan .................................. 6-170212

[51] Int. Cl.$^6$ .............................. G06K 9/36; G06K 9/46
[52] U.S. Cl. ................ 382/236; 348/405; 348/409; 348/415; 348/416; 348/558; 348/700; 369/124; 382/233; 382/238; 382/250; 386/52
[58] Field of Search ........................ 382/236, 238, 382/250, 233; 348/409, 415, 416, 405, 558, 700; 369/124; 386/52

[56] References Cited

U.S. PATENT DOCUMENTS

| | | | |
|---|---|---|---|
| 5,418,569 | 5/1995 | Ando | 348/405 |
| 5,473,378 | 12/1995 | Tamitani | 348/416 |
| 5,521,898 | 5/1996 | Ogasawara | 369/124 |
| 5,631,742 | 5/1997 | Shimoda | 386/52 |

Primary Examiner—Leo H. Boudreau
Assistant Examiner—Daniel G. Mariam
Attorney, Agent, or Firm—Jacobson, Price, Holman & Stern, PLLC

[57] ABSTRACT

An image data editing apparatus edits image data coded based on inter-image prediction. Outputted are number data for specifying image data read from a recording medium and edition point data indicative of edition points of the read image data. The image data is read from the recording medium based on the number data. The image data is separated into inter-image prediction method data and prediction residual data. Discontinuity of the image data is discriminated based on the edition point data to change the inter-image prediction extending over before and after the edition points into an inter-image prediction to be conducted within two of the edition points, and outputting changed inter-image prediction method data. The changed inter-image prediction method data and the prediction residual data are multiplexed. An image data decoding apparatus decodes image data coded based on inter-image prediction. The image data is separated into inter-image prediction data indicative of inter-image prediction method, prediction residual data, and edition point data indicative of image data edition timings. The inter-image prediction extending over before and after the edition points is changed into an inter-image prediction to be conducted within two of the edition points according to the edition point data, outputting changed inter-image prediction method data. The image data is predicted based on the changed inter-image prediction data.

3 Claims, 7 Drawing Sheets

IMAGE DATA EDITING APPARATUS AND DECODING APPARATUS

BACKGROUND OF THE INVENTION

1. Field of the Invention

The present invention relates to an editing apparatus for editing image data coded high efficiently in accordance with inter-frame or inter-field prediction processing, and a decoding apparatus for decoding the coded image data.

2. Description of the Prior Art

<Inter-image Prediction Coding and Editability>

In the field of the high efficiency coding of motion pictures, a high coding efficiency can be obtained on the basis of prediction between frames (or between fields) in dependence upon a high correlation between frames (or between fields). In this case, for the prediction processing in decoding, since reproduced images of frames other than frames to be decoded are required, it is impossible to handle only the image data obtained by coding image signals of each frame independently.

Further, when image data coded by inter-frame prediction are edited for image edition, it is necessary to provide some portions of non inter-frame prediction at which the prediction is not effected between frames. For this purpose, the inter-frame prediction is interrupted every several-frame periods and the image signals are coded independently in one frame after each period, so that image data can be edited in unit of the independent frame period. This frame period for setting the independent frame period includes 2 to 15 dependent frames and is referred to as GOP (group of picture).

In the above-mentioned case, however, when bidirectional prediction frames (referred to as B frame, hereinafter) used for MPEG (Moving Picture Coding Expert Group one of the high efficiency coding methods) exist before and after the independent frame (referred to as I frame, hereinafter), the prediction cannot be interrupted due to the bidirectional prediction, so that the bidirectional prediction is not used before the independent frame.

Figure 1:
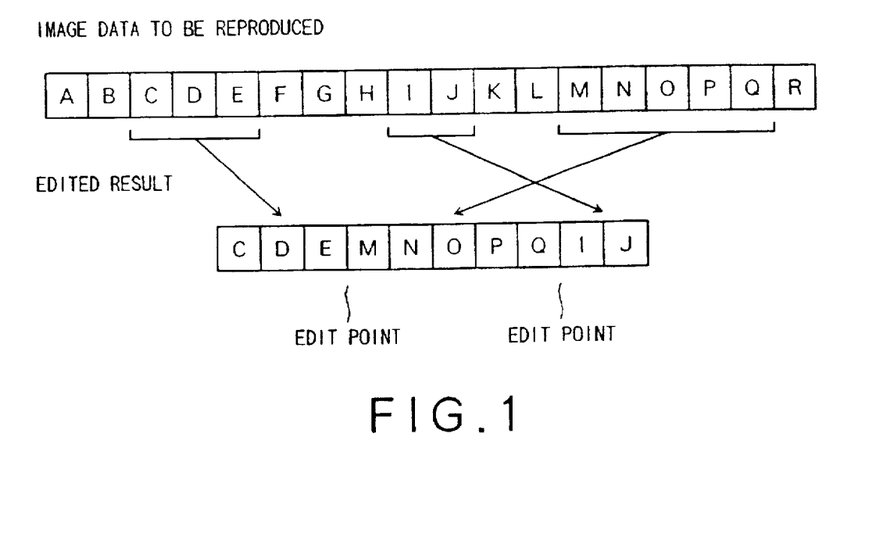
FIG. 1 is an illustration showing an example of the image data edition.

FIG. 1 shows an example of the image data edition. In FIG. 1, A, B, C, ... denote each edition unit (GOP). In the edition of image data as shown, the image data recorded in a recording medium, that is, some parts (C to E, I to J, M to Q) of motion picture image data are cut off to obtain a series of continuous image data (C to J). In comparison with the ordinary edition in unit of one frame (in which no inter-image prediction is effected), although the image data are edited in unit of GOP, the above-mentioned edition method is basically the same as the ordinary image data edition.

<Editing Apparatus>

Figure 2:
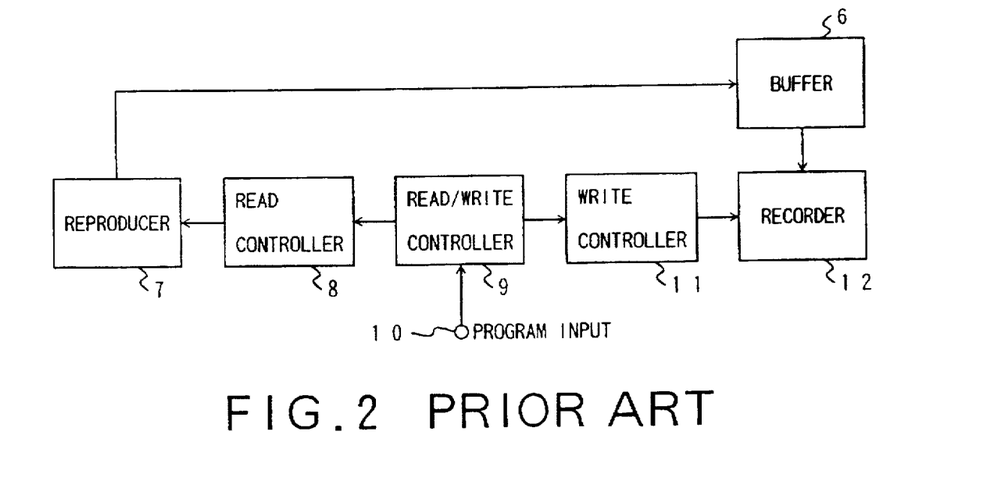
FIG. 2 is a block diagram showing an example of the construction of the prior art image data editing apparatus.

FIG. 2 shows an example of the construction of the prior art image data editing apparatus, which shows the basic construction for editing coded image data In unit of GOP.

In FIG. 2, the image data recorded in a reproducing medium (not shown), that is, non-edited motion picture image data are read by a reproducer 7. On the other hand, edited image data are recorded in a recording medium (not shown) by a recorder 12.

A read/write controller 9 reads GOP numbers for reading the motion picture image data recorded in the reproducing medium in real time in accordance with an edition program inputted through a program input terminal 10, and gives the read GOP numbers to a read controller 8. Further, location numbers indicative of where the read data are to be recorded on the recording medium are given to a write controller 11 for each GOP.

The read controller 8 detects at which positions the data corresponding to the read GOP numbers are recorded on the reproducing medium. The reproducing medium is accessed by the reproducer 7 on the basis of the detected positions. In the same way, the write controller 11 determines the positions at which the data are to be recorded on the recording medium for each GOP. The recording medium is accessed by the recorder 12 on the basis of the determined positions.

The discontinuity (caused by the read position change at the edition points) of the image data for each GOP read from the reproducing medium is absorbed by a buffer 6, so that the continuous image data can be recorded into the recording medium as continuous image data.

The above-mentioned reproducing medium is a magnetic hard disk, a photo-magnetic disk, a semiconductor memory, etc. in practice. Further, although the reproducing medium is used for reproduction in the edition processing, since the image data must be already recorded before reproduction, this medium is a recordable medium.

On the other hand, although a medium similar to the reproducing medium can be used as the recording medium, since only continuous image data are recorded, a Video Tape Recorder VTR can be used.

<Coding Apparatus>

Figure 3:
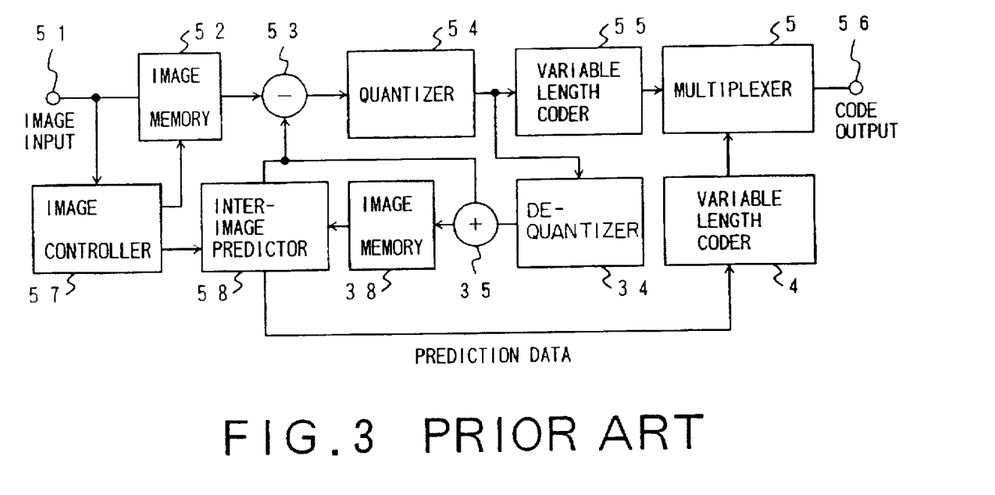
FIG. 3 is a block diagram showing an example of the construction of the prior art coding apparatus.

FIG. 3 shows an example of the construction of the prior art coding apparatus, by which inter-image prediction can be executed.

In FIG. 3, image signals inputted through an image input terminal 51 are given to an image controller 57 and an image memory 52.

The order of the image signals stored in the image memory 52 is changed according to the image prediction types such as independent frame (I frame), unidirectional frame predicted on the basis of the past frames (P frame), bidirectional prediction frame (B frame) on the basis of the control data given by an image controller 57. The image signals whose order has been changed are outputted to a subtracter 53.

The subtracter 53 subtracts the inter-image prediction signals given by an inter-image predictor 58 from the image signals outputted by the image memory 52. The subtraction results, that is, the prediction residual signals are given to a quantizer 54 In the case of the I frame, however, the image signals outputted from the image memory 52 are given to the quantizer 54 as they are.

The quantizer 54 quantizes the prediction residual signals (the image signals in the case of the I frame) at an appropriate step width, and gives the quantized signals of fixed length codes to an inverse quantizer 34 and a variable length coder 55. The variable length coder 55 codes the fixed length codes into variable length codes of compression type, and gives the coded variable length codes to a multiplexer 5. The multiplexer 5 multiplexes the data of the prediction residual signals (the image signals in the case of the I frame) and the data (e.g., prediction direction) related to the inter-image prediction given by the variable length coder 4, and outputs the multiplexed data through a code output terminal 56.

On the other hand, the inverse quantizer 34 replaces the fixed length code with a representative value, and gives the replaced representative value to an adder as the reproduced prediction residual signals (the image signals in the case of I frame). The adder 35 adds the inter-image prediction signals given by the inter-image predictor 58 to the reproduced prediction residual signals, and gives the added signals to an image memory 38 as the reproduced image signals. However, in the case of the I frame, the output signals of the inverse quantizer 34 are inputted to the image memory 38 as they are.

The image memory 38 stores image data for two frames used for the inter-image prediction, and outputs the stored image data to the inter-image predictor 58 at need.

The inter-image predictor 58 forms the inter-image prediction signals on the basis of the image type (I or P or B) given by the image controller 57, and gives the formed inter-image prediction signals to the subtracter 53 and the adder 35. In the case of the I frame, since the prediction is not executed, the inter-image prediction signals are zero.

Further, the inter-image predictor 58 gives data related to the inter-image prediction method such as motion vectors, prediction directions, etc. to the variable length coder 4. The prediction data outputted by the inter-image predictor 58 are coded into the variable length code by the variable length coder 4. The obtained variable length codes are given to the multiplexer 5.

<Decoder>

Figure 4:
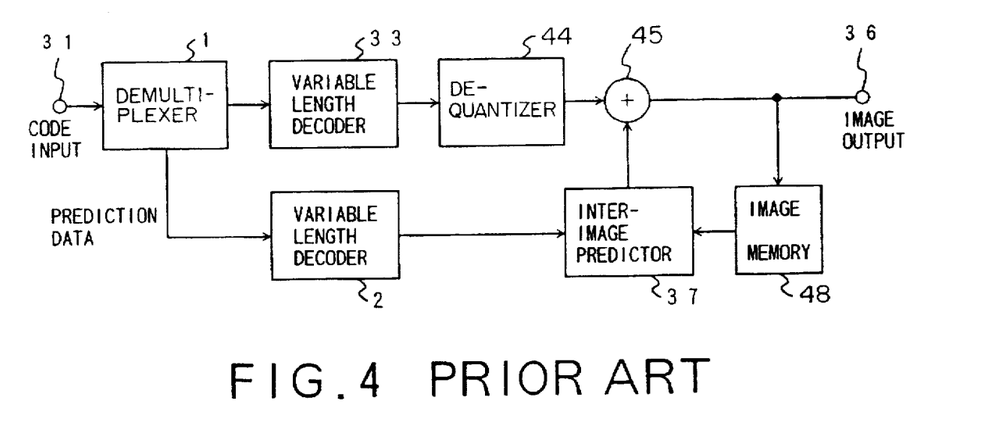
FIG. 4 is a block diagram showing an example of the construction of the prior art decoding apparatus.

FIG. 4 shows an example of the construction of the prior art decoder, which corresponds to the coder shown in FIG. 3.

Coded image data given to a code input terminal 31 are separated by a demultiplexer 1 into prediction residual signal data (referred to as prediction residual data, hereinafter) or image signal data (referred to as image data, hereinafter) and prediction data. The prediction residual data (the image data in the case of I frame) are given to a variable length decoder 33, and the prediction data are given to a variable length decoder 2, respectively.

The variable length decoder 33 returns the variable length codes to fixed length codes. The obtained fixed length codes are given to a dequantizer 44. The dequantizer 44 obtains representative quantization values corresponding to the fixed length codes. The prediction residual signals (the image signals in the case of I frame) reproduced from the dequantizer 44 are given to the adder 45.

The adder 45 adds inter-image prediction signals given by an inter-image predictor 37 to the representative quantization values, and outputs the reproduced image signals through an image output terminal 36. In addition, the reproduced image signals are stored in an image memory 48.

On the other hand, the prediction data decoded by the variable length decoder 2 are given to the inter-image predictor 37. The inter-image prediction signals are formed by use of reproduced image data stored in the image memory 48 in accordance with the prediction data, and then given to the adder 45. In the case of I frame, however, there is no inter-image prediction signal.

As described above, in the case where data coded on the basis of the inter-image prediction are edited in unit of GOP (at periods of independent images), the use of bidirectional prediction must be interrupted immediately before the independent images when coding. Further, when the bidirectional prediction is changed into the unidirectional prediction, since the amount of the generated codes increases about twice, the coding efficiency decreases. If the edition unit is about 15 frames, a drop of the coding efficiency is not large as the whole. However, where the edition unit is reduced to about 2 to 5 frames, since the bidirectional prediction can be hardly used, the coding efficiency drops markedly.

SUMMARY OF THE INVENTION

With these problems in mind, therefore, it is the object of the present invention to provide an image data editing apparatus and decoding apparatus, by which the coding efficiency will not be reduced due to the interruption of the bidirectional prediction.

To achieve the above-mentioned object, the present invention provides an image data editing apparatus, comprising: edition control means for outputting number data for specifying image data read from a recording medium and edition point data indicative of edition points of the read image data, for edition of image data coded on the basis of inter-image prediction; reading means for reading image data from the recording medium on the basis of the number data; demultiplexing means for separating the image data into inter-image prediction method data and prediction residual data; prediction data changing means for discriminating discontinuity of the image data on the basis of the edition point data, changing the inter-image prediction extending over before and after the edition points into an inter-image prediction to be conducted within two of the edition points, and outputting changed inter-image prediction method data; and multiplexing means for multiplexing the changed inter-image prediction method data of said prediction data changing means and the prediction residual data of said demultiplexing means.

Each edition point may be a boundary between a first independent field and a second independent field in two continuous independent fields.

Further, the present invention provides an image data editing apparatus, comprising: edition control means for outputting number data for specifying image data read from a recording medium and edition point data indicative of edition points of the read image data, for edition of image data coded on the basis of inter-image prediction; reading means for reading image data from the recording medium on the basis of the number data; and edition data inserting means for inserting the edition point data into the image data.

Further, present invention provides an image data decoding apparatus for decoding image data coded on the basis of inter-image prediction, comprising: demultiplexing means for separating the image data into inter-image prediction data indicative of inter-image prediction method, prediction residual data, and edition point data indicative of image data edition timings; prediction data changing means for changing the inter-image prediction extending over before and after the edition point into an inter-image prediction to be conducted within two of the edition points according to the edition point data outputted by said demultiplexing means and for outputting changed inter-image prediction method data; and inter-image predicting means for predicting image data on the basis of the changed inter-image prediction data.

DETAILED DESCRIPTION OF THE EMBODIMENTS

<1st Embodiment of Image Data Editing Apparatus>

Figure 5:
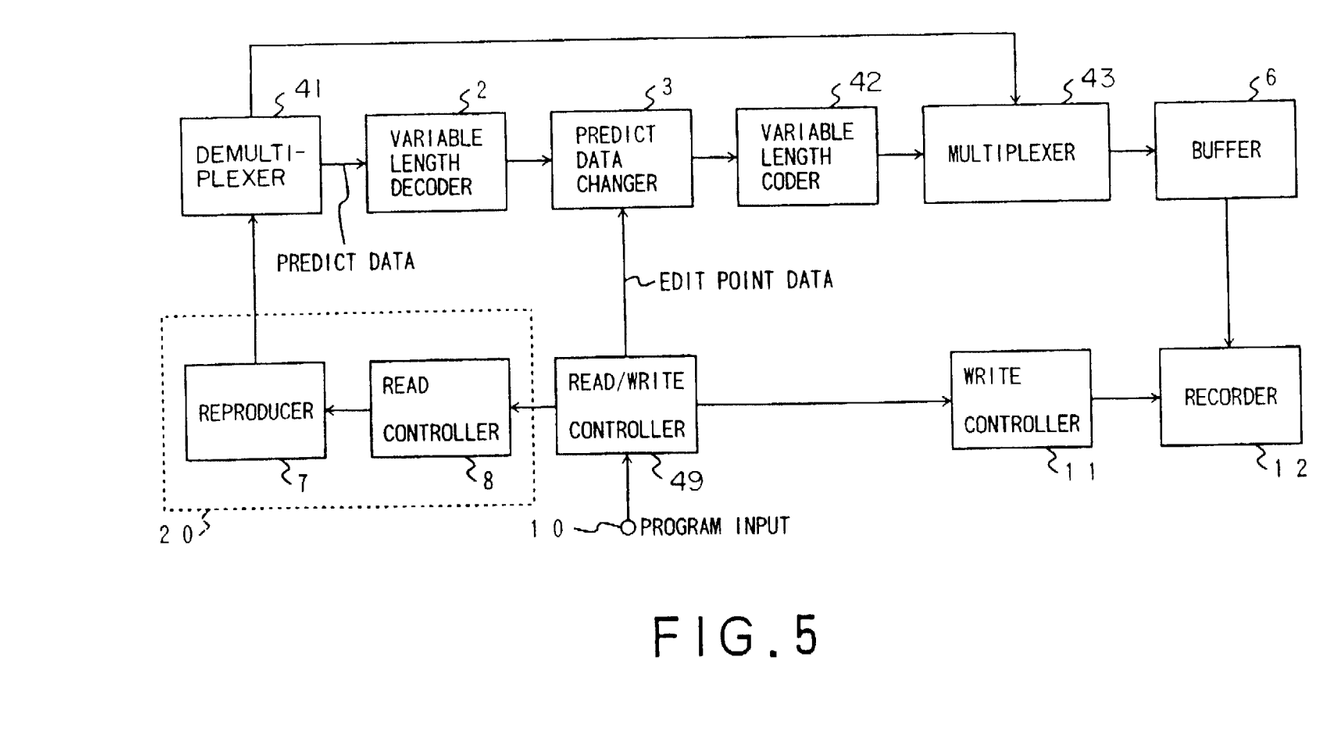
FIG. 5 is a block diagram showing a first embodiment of the image data editing apparatus according to the present invention.

FIG. 5 shows a first embodiment of the image data editing apparatus according to the present invention, in which the same reference numerals have been retained for similar composing elements which have the same functions as with the case of the prior art editing apparatus shown in FIG. 2. In comparison between the first embodiment shown in FIG. 5 and the prior art apparatus shown in FIG. 2, a demultiplexer 41, a variable length decoder 2, a prediction data changer 3, a variable length coder 42, and a multiplexer 43 are provided in addition to the prior art apparatus.

In FIG. 5, the operation of the buffer 6, the reproducer 7, the read controller 8, the write controller 11, and the recorder 12 are the same as with the case of the prior art apparatus.

Coded image data outputted by a reproducing medium (not shown) are separated into prediction residual data and prediction data by the multiplexer separator 1. The separated prediction residual data are given to the multiplexer 43, and the separated prediction data are given to the variable length decoder 2.

The variable length decoder 2 returns the variable length codes to the fixed length codes, and gives the obtained prediction data to a prediction data changer 3. The prediction data changer 3 changes the inter-image prediction method according to edition point data (e.g., flags) directly given by a read/write controller 49 in such a way that the inter-image prediction can be interrupted before and after the edition point, and outputs new changed prediction data. The new prediction data are converted by the variable length coder 42 into variable length codes and given to the multiplexer 43.

Here, although the prediction data changer 3 can know the edition point on the basis of the edition point data directly given by the read/write controller 49, it is also possible to know the discontinuity of the GOP numbers outputted by the variable length decoder 2 instead.

The multiplexer 43 multiplexes the new prediction data and the separated prediction residual data, and outputs the multiplexed data.

The method of changing the inter-image prediction will be explained in more detail with reference to FIGS. 6A and 6B.

Figure 6A:
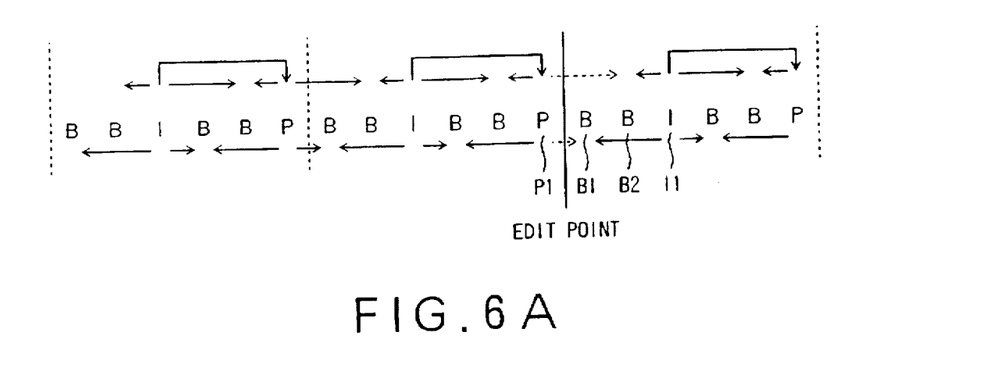
FIGS. 6A and 6B are illustrations showing the prediction limits at the edition points at I,B and P frames and I and B fields, respectively.
Figure 6B:
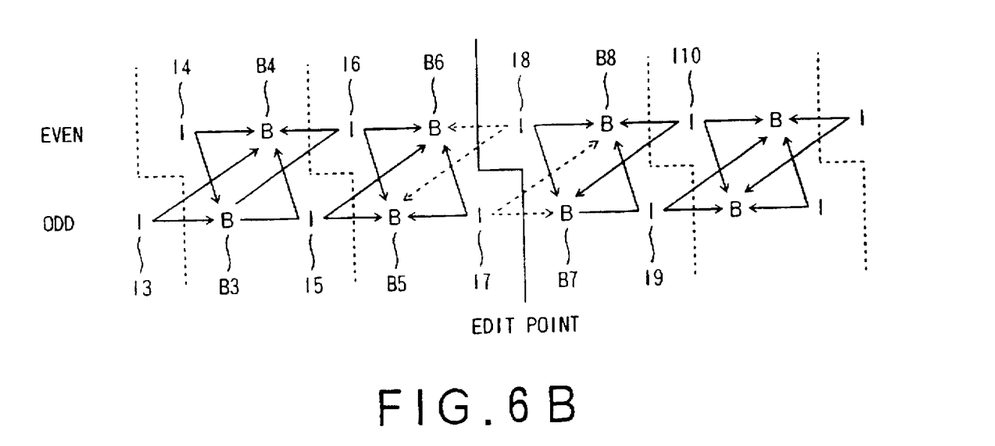

FIGS. 6A and 6B show the prediction restriction at the edition points at each of I, B and P frames and I and B fields, respectively, which indicate from which frame each frame can be predicted by arrows. Further, the boundary of GOPs is shown by a dashed line, and an edition point at the GOP boundary is shown by a solid line.

As shown in FIGS. 6A and 6B, in the present invention, the inter-image prediction extending over before and after the edition point is changed to the inter-image prediction conducted within two edition points.

The practical method of changing the inter-image prediction method will be explained hereinbelow.

In the case of the prediction in unit of frame (e.g., MPEGI) such that the image types change as I (independent frame), P (past unidirectional prediction frame) and B (bidirectional prediction frame), as shown by dashed arrows in FIG. 6A, the prediction method for the B frames (B1, B2) between the preceding P frame (P1) and the succeeding I frame (I1) is changed to the prediction on the basis of the succeeding independent frame I1. The reason why the prediction method after the edition point is changed is that when the image quality deteriorates near the edition point, the image deterioration immediately after the image change is not noticeable, as compared with that immediately before the image change.

With respect to the B frames, although there exists the prediction mode for each block, the change of the respective prediction modes can be changed as follows, where MV denotes a motion vector in prediction:

TABLE 1

| (Prediction mode) | (Change method) |
|---|---|
| Bidirectional | → Only reverse MV is used, and changed to only reverse direction prediction |
| Forward | → MV is set to reverse direction according to time, and changed to reverse direction prediction |
| Reverse direction | → Not changed |
| Independent | → Not changed |

As described above, when the prediction mode is the reverse direction and the independence, the prediction method is not changed. But, the forward prediction is changed to the reverse direction prediction, and further the bidirectional prediction is restricted to the reverse direction prediction.

Figure 7A:
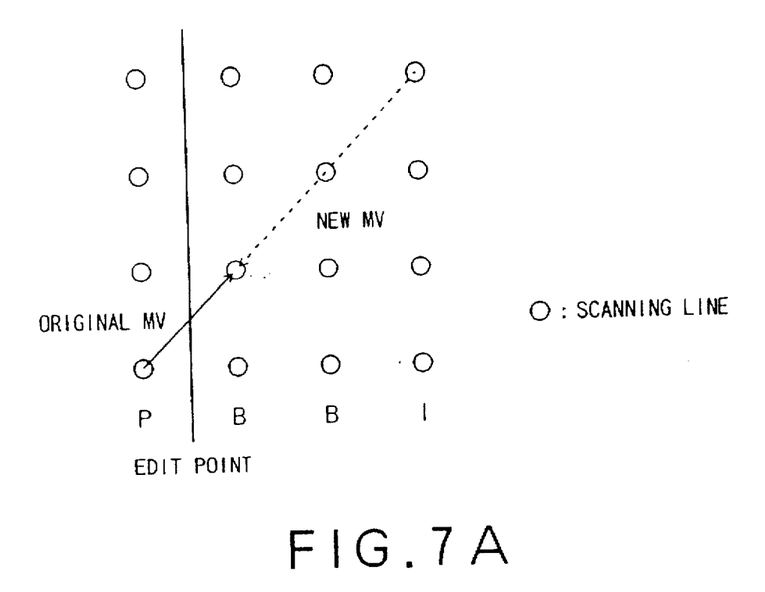
FIGS. 7A and 7B are illustrations for assistance in explaining the change of motion vectors due to the prediction change at the frame and field processing, respectively.
Figure 7B:
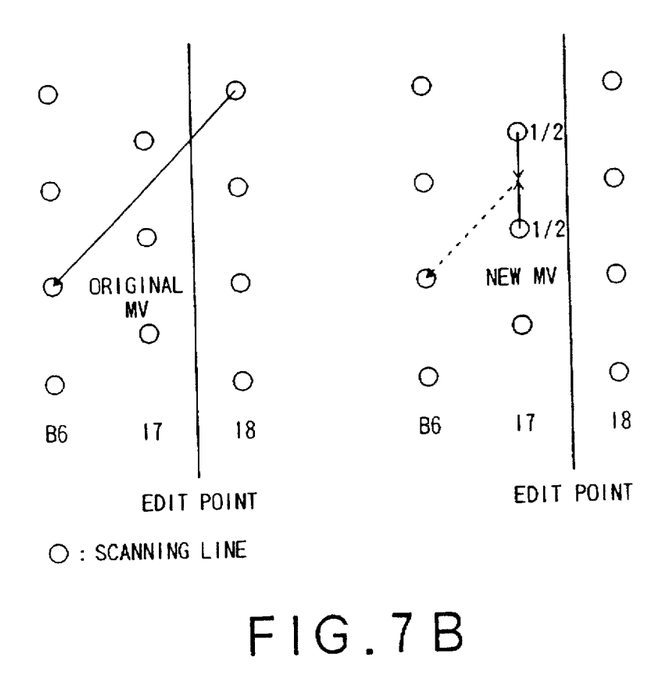

FIGS. 7A and 7B show the changes of the motion vector in the prediction change at each of the frame processing and the field processing.

In FIGS. 7A and 7B, the abscissa is a time axis and the ordinate is a vertical direction of the picture, respectively. Therefore, white circles indicate positions of the horizontal scanning lines as a model view.

As already explained, since the forward direction prediction is changed to the reverse direction prediction, as shown in FIG. 7A, a motion vector (a new MV) predicted on the basis of the succeeding prediction frame (i.e., I frame) is used instead of a motion vector (an original MV) in the forward direction prediction, In this case, since the prediction is made on the basis of the frame not originally used for prediction, the image deterioration is anticipated. In the ordinary image, however, since the percentage of the forward direction mode is about 15%, a big problem will not arise.

Here, since the prediction is restricted from the bidirection to the reverse direction, the amount of data of the MV is reduced in general. Therefore, stuff codes (dummy data) are inserted into the prediction data to match the amount of codes.

Figure 8:
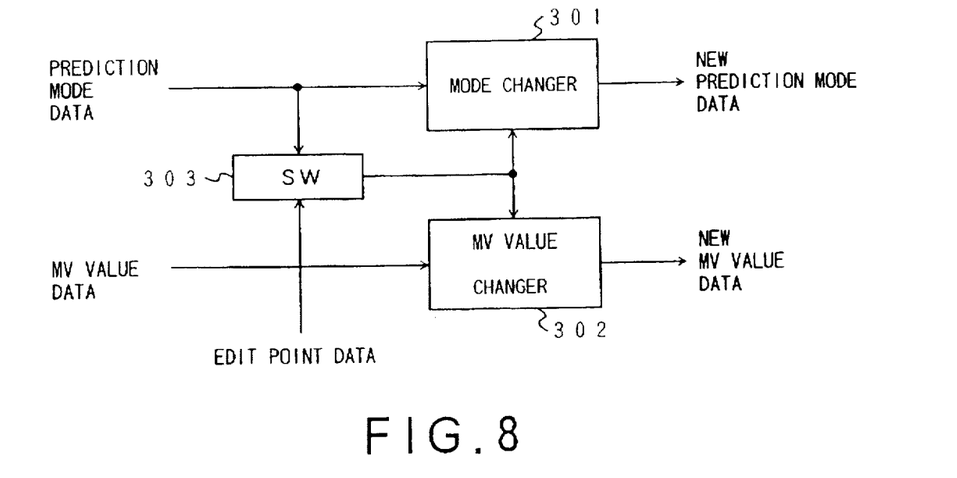
FIG. 8 shows an example of the prediction data changer 3 of FIG. 5.

FIG. 8 shows an example of the prediction data changer 3.

The variable length decoder 2 of FIG. 5 gives prediction mode data (bidirection, forward direction, reverse direction or independent) and MV value data (two in bidirection, one in forward or reverse direction or zero in independent)

included in the prediction data of fixed code length to a mode changer 301 and a MV value changer 302, respectively.

The prediction mode data is further given to a switch 303. Also given to the switch 303 is the edition point data from the read/write controller 49 of FIG. 5. When the edition point data is given, the switch 303 generates and gives a control signal to the mode changer 301 and the MV value changer 302.

In response to the control signal and the prediction mode data, the mode changer 301 changes prediction mode per block in the B frame at the edition point of FIG. 6A.

Further, in response to the control signal and the MV value data, the MV value changer 302 calculates the new MV value according to the distance of a predicted frame from the B frame. When a frame distance in the forward prediction F and a frame distance in the reverse prediction is R, the new MV value is obtained by $(-R/F) \times MV$. The new prediction mode data and the MV value data are given to the variable length coder 4 of FIG. 5.

<Edition Coding>

The edition coding for suppressing the deterioration at the edition points will be explained with reference to FIG. 6B and FIG. 7B, in which inter-image prediction is made for the interlace signals in unit of field.

In FIG. 6B, "even" indicates the even numbers of fields, and "odd" indicates the odd numbers of fields. The order of the edition codings is I3 (odd I field), I4 (even I filed), B3 (odd a field), B4, I5, I6, . . . , for instance. In FIG. 6B, the boundaries shown by dashed or solid lines indicate GOP boundaries, among which a boundary shown by a solid line represents an edition point. As shown, I fields are continued, and the edition point is determined at an intermediate point between the two continuous I fields. In this case, the I fields exist at the first GOP and the final GOP.

In the field B5 predicted on the basis of the fields I5 to I8 before edition, I8 is replaced with I7 in edition. In the same way, in the prediction of B6, I8 is replaced with I7; in the prediction B7, I7 is replaced with I8; in the prediction B8, I7 is replaced with I8, respectively.

In the above-mentioned prediction, since only the even or odd numbers of the prediction fields are changed without changing the prediction direction, the image deterioration due to the prediction change is relatively slight.

The construction of the coding apparatus using the coding method as described above is the same as with the case of the prior art coding apparatus as shown in FIG. 3. However, the control contents of the image controller 57 are different between the two. That is, the coding apparatus of the present invention is so controlled that the I fields continue. Further, since the inter-image prediction is effected in unit of field, the entire processing is made in unit of field.

As shown in FIG. 6B, although the inter-image prediction shown by the dashed arrow is changed to another inter-image prediction method, in the case of each B field prediction before and after the edition point, since only the even field or odd field of one prediction line is changed, the image quality deteriorates slightly. Further, where the image deterioration becomes less when the prediction direction is changed (rather than when the even or odd field is changed), as with the case of a still picture, there exists no problem even if the prediction direction is changed.

When the even or odd number of the field is changed, the MV must be determined under consideration of both the time relationship and the even or odd number, as shown in FIG. 7B. The field numbers shown in FIG. 7B correspond to the filed numbers shown in FIG. 6B, respectively. Further, In FIG. 7B, the left side illustration shows a motion vector (an original MV) before edition, and the right side illustration shows the motion vector (a new MV) after edition. That is, FIG. 7B indicates that the original MV is replaced with the new MV as shown by a dashed arrow.

<2nd Embodiment of Image Data Editing Apparatus

Figure 9:
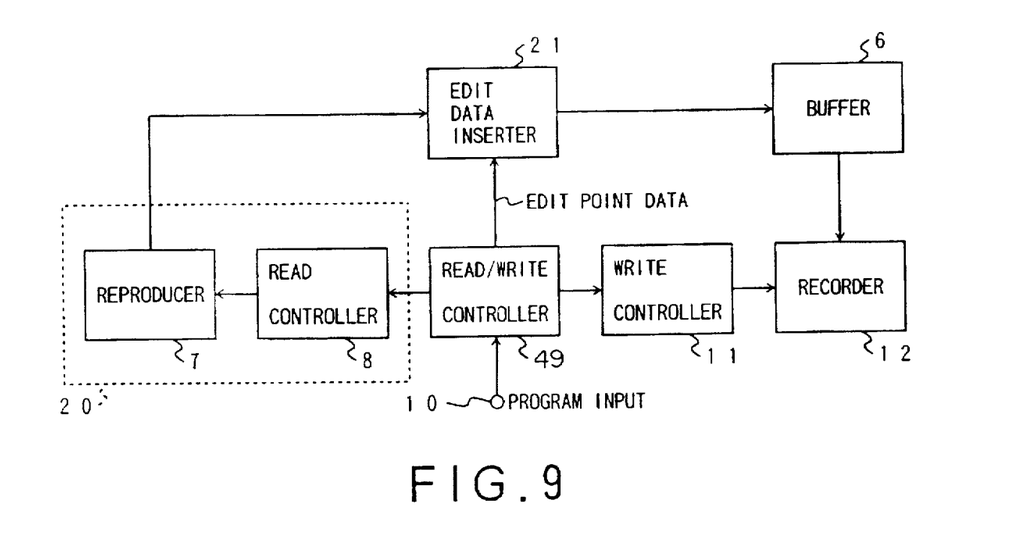
FIG. 9 is a block diagram showing a second embodiment of the image data editing apparatus according to the present invention.

FIG. 9 shows a second embodiment of the image data editing apparatus according to the present invention, in which the same reference numerals have been retained for similar elements which have the same functions as with the case of the prior art editing apparatus shown in FIG. 2 without repeating the similar description. In this second embodiment, only the edition point data are inserted on the assumption that the prediction can be changed in the decoding.

The second embodiment shown in FIG. 9 is different from the prior art apparatus shown in FIG. 2 in that an edition data inserter 21 is additionally provided. In FIG. 9, the operation of each of the buffer 6, the reproducer 7, the read controller 8, the write controller 11, and the recorder 12 is the same as with the case of the prior art apparatus shown in FIG. 2.

Image data read from a reproducing medium (not shown) are given to the edition data inserter 21. The edition data inserter 21 inserts an edition point flag (indicative of that an end of GOP is an edition point) into each GOP header of the image data, in accordance with the edition point data directly given by the read/write controller 49.

Instead, it is also possible to allow the edition data inserter 21 to insert an edition point flag whenever the numbers of the GOPs of the image data outputted from the reproducer 7 are not continuous.

<Embodiment of Decoder>

Figure 10:
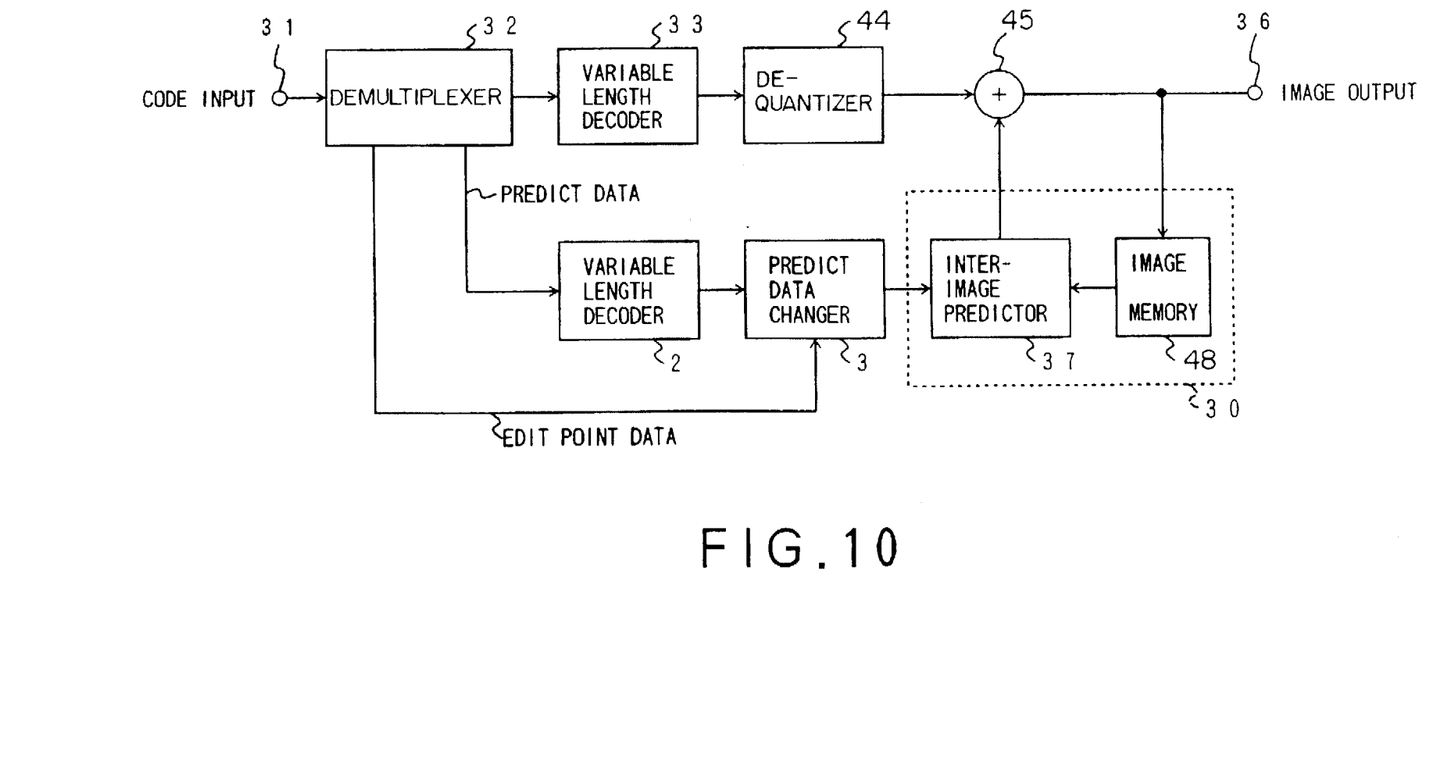
FIG. 10 is a block diagram showing an embodiment of the image data decoding apparatus according to the present invention.

FIG. 10 shows an embodiment of the image data decoding apparatus according to the present invention, in which the same reference numerals have been retained for similar elements which have the same functions as with the case of the prior art decoding apparatus shown in FIG. 4 without repeating the similar description. The decoding apparatus decodes the image data edited by the image data editing apparatus shown in FIG. 9.

The decoding apparatus shown in FIG. 10 is different from the prior art decoding apparatus shown in FIG. 4 in that a prediction data changer 3 is additionally provided, and further the operation of a demultiplexer 32 is different. In FIG. 10, the operation of each of the variable length decoders 2 and 33, the dequantizer 44, the adder 45, the inter-image predictor 37, and the Image memory 48 is the same as with the case of the prior art apparatus shown in FIG. 4.

The demultiplexer 32 separates the codes given through the code input terminal 31 into the prediction residual data, the prediction data, and the edition point flag. The prediction residual data are given to the variable length decoder 33. The prediction data are given to the variable length decoder 2. The edition point flag is given to the prediction data changer 3.

The prediction data decoded by the variable length decoder 2 are given to the prediction data changer 3. The prediction data changer 3 changes the prediction data on the basis of the edition point flag at the GOP adjacent to the edition point, in the same way as with the case of the image data editing apparatus shown in FIG. 5. The changed prediction data are given to the inter-image predictor 37. The inter-image predictor 37 predicts the image data according to the prediction data, so that the edited image data can be reproduced in the same way as with the case of the editing apparatus shown in FIG. 5.

As described above, in the image data editing apparatus and the image data decoding apparatus according to the present invention, since image data can be coded by use of the bidirectional prediction even at the edition points and further since the prediction method extending over before and after the edition point is changed to another prediction method in edition and decoding, it is possible to prevent the coding efficiency from being reduced, which would otherwise be caused by the interruption of the bidirectional prediction in edition.

Further, in the bidirectional prediction, since the amount of codes can be reduced by ½ to ⅓ times smaller than that of the unidirectional prediction, in particular when a number of edition points are set finely in unit of several frames, it is possible to markedly improve the coding efficiency.

In addition, since the method according to the present invention can be adopted to the ordinary coded image data to which no edition is taken into account, as far as the independent images are provided periodically, this is advantageous from the edition standpoints Therefore, whenever the image data are coded, it is unnecessary to process the image data by dividing them into the editing data and non-editing data, so that it is possible to simplify the handling of both the image data and the coding apparatus.

What is claimed is:

1. An image data editing apparatus for edition of image data coded by inter-image prediction, comprising:

edition control means for outputting number data for specifying image data to be read from a recording medium and edition point data indicative of edition points of the image data;

reading means for reading the image data from the recording medium on the basis of the number data output from the edition control means;

demultiplexing means for separating the image data read from the recording medium into inter-image prediction data indicating an inter-image prediction method and prediction residual data;

inter-image prediction data changing means for changing inter-image prediction data indicating an inter-image prediction method to be conducted with respect to images extending over before and after the edition points into inter-image prediction data indicating and inter-image prediction method to be conducted with respect to images within two of the edition points, on the basis of the edition point data output from the edition control means, and outputting changed inter-image prediction data; and multiplexing means for multiplexing the changed inter-image prediction data output by said inter-image prediction data changing means and the prediction residual data output by said demultiplexing means.

2. The image data editing apparatus of claim 1, wherein each edition point is a boundary between a first independent field and a second independent field in two continuous independent fields.

3. An image data decoding apparatus for decoding image data coded on the basis of inter-image prediction, comprising:

demultiplexing means for separating input image data into inter-image prediction data indicative of inter-image prediction method, prediction residual data, and edition point data indicative of image data edition timings;

inter-image prediction data changing means for changing inter-image prediction data indicating an inter-image prediction method to be conducted with respect to images extending over before and after edition points into inter-image prediction data indicating an inter-image prediction method to be conducted with respect to images within two of the edition points according to the edition point data outputted by said demultiplexing means and for outputting changed inter-image prediction data; and inter-image predicting means for predicting image data on the basis of the changed inter-image prediction data.

* * * * *